United States Patent
Kurose et al.

(10) Patent No.: US 10,138,931 B2
(45) Date of Patent: Nov. 27, 2018

(54) SYNTHETIC RESIN-MADE SLIDING BEARING

(71) Applicant: OILES CORPORATION, Tokyo (JP)

(72) Inventors: Kouhei Kurose, Fujisawa (JP); Katsunori Saito, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/520,576

(22) PCT Filed: Oct. 22, 2015

(86) PCT No.: PCT/JP2015/005317
§ 371 (c)(1),
(2) Date: Apr. 20, 2017

(87) PCT Pub. No.: WO2016/067569
PCT Pub. Date: May 6, 2016

(65) Prior Publication Data
US 2017/0314615 A1    Nov. 2, 2017

(30) Foreign Application Priority Data
Oct. 27, 2014   (JP) ................................ 2014-218388

(51) Int. Cl.
```
F16C 17/04     (2006.01)
F16C 17/02     (2006.01)
F16C 33/20     (2006.01)
C08J 5/00      (2006.01)
F16C 33/02     (2006.01)
```
(Continued)

(52) U.S. Cl.
CPC .......... *F16C 17/022* (2013.01); *B60G 15/068* (2013.01); *C08J 5/00* (2013.01); *F16C 17/04* (2013.01); *F16C 33/02* (2013.01); *F16C 33/20* (2013.01); *F16C 33/74* (2013.01);
(Continued)

(58) Field of Classification Search
CPC .............................. F16C 7/04; F16C 2326/05
See application file for complete search history.

(56) References Cited

U.S. PATENT DOCUMENTS 4,907,289 A * 3/1990 Kamimura ........... B60G 15/068
                                                     384/124
5,476,326 A * 12/1995 Ueno ................... B60G 15/067
                                                     384/125
(Continued)

FOREIGN PATENT DOCUMENTS

CN      1136344 A      11/1996
CN      1748090 A      3/2006
(Continued)

OTHER PUBLICATIONS

International Search Report for PCT/JP2015/005317, dated Dec. 15, 2015, 2 pages.
(Continued)

*Primary Examiner* — Thomas R Hannon
(74) *Attorney, Agent, or Firm* — Nixon & Vanderhye P.C.

(57) ABSTRACT

A synthetic resin-made sliding bearing 1 include a synthetic resin-made upper casing 2, a synthetic resin-made lower casing 3, and a thrust sliding bearing piece 4 serving as a synthetic resin-made thrust sliding bearing interposed between the lower casing 3 and the upper casing 2 fitted over the lower casing 3.

18 Claims, 5 Drawing Sheets

(51) Int. Cl.
   *B60G 15/06*      (2006.01)
   *F16C 33/74*      (2006.01)
   *F16C 35/02*      (2006.01)

(52) U.S. Cl.
   CPC .......... *F16C 35/02* (2013.01); *F16C 2326/05* (2013.01); *Y02T 10/865* (2013.01)

(56) References Cited

U.S. PATENT DOCUMENTS

| | | | |
|---|---|---|---|
| 5,531,524 | A | 7/1996 | Brouwer |
| 7,273,317 | B2 * | 9/2007 | Miyata ................. B60G 15/068 384/420 |
| 2006/0140523 | A1 | 6/2006 | Miyata et al. |
| 2006/0215944 | A1 | 9/2006 | Watai et al. |
| 2011/0135228 | A1 | 6/2011 | Kaneko et al. |
| 2014/0355915 | A1 * | 12/2014 | Saito ................... B60G 15/068 384/368 |

FOREIGN PATENT DOCUMENTS

| | | |
|---|---|---|
| EP | 1 548 303 A1 | 6/2005 |
| EP | 2 306 043 A1 | 4/2011 |
| JP | 2-1532 | 1/1990 |
| JP | 2-6263 | 2/1990 |
| JP | 4-52488 | 12/1992 |
| JP | 8-2500 | 1/1996 |
| JP | 2014-129888 | 7/2014 |

OTHER PUBLICATIONS

Notice on the First Office Action dated Jul. 4, 2018 in Chinese Application No. 201580057945.X, with English translation (22 pages).
Extended European Search Report dated Apr. 19, 2018 in European Application No. 15855007.9 (12 pages).

* cited by examiner

SYNTHETIC RESIN-MADE SLIDING BEARING

This application is the U.S. national phase of International Application No. PCT/JP2015/005317 filed 22 Oct. 2015, which designated the U.S. and claims priority to JP Patent Application No. 2014-218388 filed 27 Oct. 2014, the entire contents of each of which are hereby incorporated by reference.

TECHNICAL FIELD

The present invention relates to a synthetic resin-made sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, among the strut-type suspensions used for front wheels of four-wheeled motor vehicles and having a structure in which a strut assembly incorporating a hydraulic shock absorber in an outer cylinder integrated with a main shaft is combined with a coil spring, there is a type in which when the strut assembly rotates together with the coil spring in the steering operation, the piston rod of the strut assembly rotates, and a type in which the piston rod does not rotate. In the strut-type suspension of either type, there are cases where, a bearing is used between a mounting member on the vehicle body and an upper spring seat of the coil spring, so as to allow smooth rotation of the strut assembly.

In this bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. Meanwhile, the sliding bearing has a high frictional torque as compared to the rolling bearing, and therefore has the possibility of making the steering operation heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

PRIOR ART DOCUMENTS

Patent Documents

[Patent Document 1] JP-UM-B-4-52488
[Patent Document 2] JP-UM-B-2-1532
[Patent Document 3] JP-UM-B-2-6263
[Patent Document 4] JP-UM-B-8-2500

SUMMARY OF THE INVENTION

Problems that the Invention is to Solve

To overcome the above-described problems, the present applicant proposed synthetic resin-made thrust sliding bearings which are each comprised of a synthetic resin-made upper casing, a synthetic resin-made lower casing, and a synthetic resin-made bearing piece interposed between the upper and lower casings, wherein sealing portions based on labyrinth action are formed on an inner peripheral surface side and an outer peripheral surface side to prevent the ingress of foreign objects such as dust onto the bearing sliding surfaces by means of the sealing portions (described in Patent Document 1, Patent Document 2, Patent Document 3, and Patent Document 4).

With these synthetic resin-made thrust sliding bearings, it is possible to overcome the problem of an increase in the steering operating force due to the dust seal which is formed of a rubber elastomer and fitted between the sliding surfaces in such a manner as to surround the sliding surfaces, and it is possible to obtain a stable and smooth steering operating force by preventing as practically as possible the ingress of foreign objects such as dust onto the sliding surfaces.

The sliding bearing including the upper casing, the lower casing, and the thrust sliding bearing piece interposed between the upper casing and the lower casing improves sliding characteristics such as low frictional property and wear resistance. However, in a case where a fluctuating load is applied to such a sliding bearing in the radial direction and a displacement occurs to the lower casing in the radial direction, portions which form a passage like a labyrinth allowing a space between the upper casing and the lower casing with the thrust sliding bearing piece disposed therein to communicate with the outside may possibly interfere with (press and contact) each other in the radial direction. As a result, there is a possibility that deformation, damage, breakage, or the like may occur in these portions. Furthermore, in a case where relative sliding in the rotating direction (circumferential direction) occurs in the portions where interference has occurred, an increase in the frictional resistance may result, possibly lowering the sliding characteristics.

The present invention has been devised in view of the above-described aspects, and its object is to provide a synthetic resin-made sliding bearing which, even if a fluctuating load is applied to the lower casing in the radial direction and a radial relative displacement occurs to the lower casing, is capable of avoiding interference attributable to the mutual pressing and contacting in the radial direction of those portions of the upper casing and the lower casing that define clearances for forming a passage like a labyrinth allowing the space between the upper casing and the lower casing with the thrust bearing disposed therein to communicate with the outside, and which does not cause deformation, damage, breakage, or the like to occur in those portions and does not cause a decline in the sliding characteristics attributable to the relative sliding in those portions.

Means for Solving the Problems

A synthetic resin-made sliding bearing in accordance with one aspect of the present invention comprises: a synthetic resin-made upper casing, a synthetic resin-made lower casing, and a synthetic resin-made thrust sliding bearing interposed between the lower casing and the upper casing fitted over the lower casing, wherein a radial minimum width of clearances extending in such a manner as to intersect a radial direction, among clearances for forming an outer peripheral side passage which allows a radially outer peripheral portion of a space between the upper casing and the lower casing with the thrust sliding bearing disposed therein to communicate with an outside, is equal to or greater than a radially relatively displaceable amount of the lower casing with respect to the upper casing which is regulated by a shaft inserted through the upper casing and the lower casing.

A synthetic resin-made sliding bearing in accordance with another aspect of the present invention comprises: a synthetic resin-made upper casing; a synthetic resin-made lower casing; and a synthetic resin-made thrust sliding bearing interposed between the lower casing and the upper casing fitted over the lower casing, wherein a radial minimum width of clearances extending in such a manner as to intersect a radial direction, among clearances for forming an outer peripheral side passage which allows a radially outer peripheral portion of a space between the upper casing and the lower casing with the thrust sliding bearing disposed therein to communicate with an outside and clearances extending in such a manner as to intersect the radial direction among clearances for forming an inner peripheral side passage which allows a radially inner peripheral portion of the space to communicate with the outside, is equal to or greater than a radially relatively displaceable amount of the lower casing with respect to the upper casing which is regulated by a shaft inserted through the upper casing and the lower casing.

According to the synthetic resin-made sliding bearing in accordance with the above-described aspects of the present invention, in the event that a fluctuating load is applied particularly to the lower casing in the radial direction and causes a radial displacement in the lower casing, it is possible to avoid interference attributable to the pressing and contacting in the radial direction of those portions of the upper casing and the lower casing that define the clearances for forming the passages. This is because, in the case where there is provided the outer peripheral side passage allowing the outer peripheral portion of the space between the upper casing and the lower casing with the thrust sliding bearing disposed therein to communicate with the outside, the radial minimum width of clearances extending in such a manner as to intersect the radial direction among the clearances for forming that passage is equal to or greater than the radially relatively displaceable amount attributable to radial clearances (clearances between the shaft and the respective inner peripheral surfaces of the upper casing and the lower casing defining the circular holes through which the shaft is passed) of the lower casing with respect to the upper casing which is regulated by the shaft passed through the upper casing and the lower casing. Additionally, this is also because, in the case where there is provided the inner peripheral side passage allowing the radially inner peripheral portion of the space between the upper casing and the lower casing with the thrust sliding bearing disposed therein to communicate with the outside, the radial minimum width of clearances extending in such a manner as to intersect the radial direction among the clearances for forming that passage is equal to or greater than the relatively displaceable amount attributable to the radial clearances of the lower casing with respect to the upper casing which is regulated by the shaft passed through the upper casing and the lower casing, and which does not cause defects such as deformation, damage, breakage, or the like to occur in those portions and does not cause a decline in the sliding characteristics attributable to the relative sliding in those portions.

In the synthetic resin-made sliding bearing in accordance with the present invention, the thrust sliding bearing interposed between the lower casing and the upper casing may be constituted by a thrust sliding bearing portion which is integrally formed on one of the lower casing and the upper casing and has a surface in slidable contact with the other one of the lower casing and the upper casing, or may alternatively be constituted by a thrust sliding bearing piece which is formed separately from the lower casing and the upper casing, and which has an upper surface which is in slidable contact with the lower casing and a lower surface which is in slidable contact with the upper casing.

Furthermore, in the synthetic resin-made sliding bearing in accordance with the present invention, at least one of the outer peripheral side passage and the inner peripheral side passage may be constituted by a single radial clearance, or may alternatively be constituted by a plurality of radial clearances and vertical clearances allowing the plurality of radial clearances to communicate with each other so as to form a passage such as a labyrinth.

A synthetic resin-made sliding bearing in accordance with still another aspect of the present invention comprises: a synthetic resin-made upper casing including an annular upper plate portion having a first inner peripheral surface, a cylindrical first suspended portion formed integrally on a lower surface of the upper plate portion, and a cylindrical engaging suspended portion formed integrally on the lower surface of the upper plate portion so as to form an annular upper outer groove by an inner peripheral surface thereof in cooperation with an outer peripheral surface of the first suspended portion; a synthetic resin-made lower casing including an annular lower plate portion having a second inner peripheral surface, a cylindrical portion formed integrally on a lower surface of the lower plate portion and having a third inner peripheral surface, a cylindrical first projecting portion formed integrally on an upper surface of the lower plate portion, and a cylindrical engaging protruding portion formed integrally on the upper surface of the lower plate portion so as to form an annular lower outer groove by an inner peripheral surface thereof in cooperation with an outer peripheral surface of the first projecting portion; and a synthetic resin-made thrust sliding bearing piece disposed in a space between the upper casing and the lower casing such that an upper surface thereof is brought into slidable contact with the lower surface of the upper plate portion of the upper casing fitted over the lower casing, while a lower surface thereof is brought into slidable contact with the upper surface of the lower plate portion, wherein the first suspended portion is disposed in the lower outer groove with a radial first clearance and a radial second clearance between an inner peripheral surface and the outer peripheral surface thereof, on the one hand, and the outer peripheral surface of the first projecting portion and the inner peripheral surface of the engaging protruding portion, on the other hand, respectively, the engaging suspended portion is disposed radially outwardly of the engaging protruding portion with a radial third clearance between the inner peripheral surface thereof and an outer peripheral surface of the engaging protruding portion, and an outer peripheral side passage formed by the first suspended portion, the first projecting portion, the engaging suspended portion, and the engaging protruding portion allows a radially outer peripheral portion of the aforementioned space to communicate with an outside, a radial minimum width of each of the first to third clearances being equal to or greater than a radially relatively displaceable amount of the lower casing with respect to the upper casing which is regulated by a shaft inserted in circular holes defined by the first to the third inner peripheral surfaces.

According to the synthetic resin-made sliding bearing in accordance with this aspect, since the radial minimum width of the first to third clearances for forming the outer peripheral side passage is equal to or greater than the radially relatively displaceable amount of the lower casing with respect to the upper casing which is regulated by the shaft inserted in the circular holes defined by the first to the third inner peripheral surfaces, even if a fluctuating load is applied to the lower casing in the radial direction and a relative displacement occurs thereto, it is possible to avoid interference attributable to the mutual pressing and contacting in the radial direction of the inner peripheral surface and the outer peripheral surface of the first suspended portion, the outer peripheral surface of the first projecting portion, the inner peripheral surface of the engaging suspended portion, and the inner peripheral surface and the outer peripheral surface of the engaging protruding portion which form the outer peripheral side passage, without causing deformation, damage, breakage, or the like to occur in the first suspended portion, the first projecting portion, the engaging suspended portion, and the engaging protruding portion and without causing a decline in the sliding characteristics attributable to the relative sliding at the first suspended portion, the first projecting portion, the engaging suspended portion, and the engaging protruding portion.

According to a further aspect of the above-described synthetic resin-made sliding bearing in accordance with the present invention, the first inner peripheral surface has preferably the same diameter as the diameter of the second inner peripheral surface, the third inner peripheral surface has the same diameter as the diameter of the second inner peripheral surface and is flush with the second inner peripheral surface, and the radial minimum width of each of the first to third clearances is equal to or greater than a smaller one of two radial clearances between the radial second and third inner peripheral surfaces, on the one hand, and an outer peripheral surface of the shaft, one the other hand, respectively.

According to a still further aspect of the synthetic resin-made sliding bearing in accordance with the present invention, there is further provided a second projecting portion formed integrally on the upper surface of the lower plate portion and having an outer peripheral surface for forming an annular lower recess in cooperation with an inner peripheral surface of the second projecting portion and the upper surface of the lower plate portion, and the thrust sliding bearing piece is disposed in the lower recess in the aforementioned space, in which case the second projecting portion may have the inner peripheral surface which has the same diameter as the second inner peripheral surface and is flush with the second inner peripheral surface.

According to the still further aspect of the above-described synthetic resin-made sliding bearing in accordance with the present invention, since the thrust sliding bearing piece is disposed in the lower recess, even if a fluctuating load is applied to the lower casing in the radial direction and a radial relative displacement occurs between the upper casing and the lower casing, it is possible to maintain the original radial position of the thrust sliding bearing piece.

In the present invention, the upper casing may further include a cylindrical second suspended portion formed integrally on the lower surface of the upper plate portion so as to form an annular upper recess by the outer peripheral surface thereof in cooperation with the lower surface of the upper plate portion and the inner peripheral surface of the first suspended portion. In this case, the second projecting portion may be integrally formed on the upper surface of the lower plate portion in such a manner as to be located radially outwardly away from the second inner peripheral surface, the second suspended portion may be suspended toward the upper surface of the lower plate portion so as to form a radial fourth clearance between the outer peripheral surface thereof and the inner peripheral surface of the second projecting portion, and an inner peripheral side passage formed by the second suspended portion and the second projecting portion may allow a radially inner peripheral portion of the aforementioned space to communicate with the outside, a radial minimum width of the fourth clearance being equal to or greater than the aforementioned relatively displaceable amount, or equal to or greater than the smaller one of the two radial clearances between the radial second and third inner peripheral surfaces, on the one hand, and the outer peripheral surface of the shaft, one the other hand, respectively.

In the synthetic resin-made sliding bearing of the present invention in which the inner peripheral side passage is formed in addition to the outer peripheral side passage, since the radial minimum width of the fourth clearance for forming the inner peripheral side passage is equal to or greater than the aforementioned relatively displaceable amount, even if a fluctuating load is applied to the lower casing in the radial direction and a radial relative displacement occurs between the upper casing and the lower casing, it is possible to avoid interference attributable to the mutual pressing and contacting in the radial direction of the outer peripheral surface of the second suspended portion and the inner peripheral surface of the second projecting portion which form the inner peripheral side passage, without causing deformation, damage, breakage, or the like to occur in the second suspended portion and the second projecting portion and without causing a decline in the sliding characteristics attributable to the relative sliding at the second suspended portion and the second projecting portion.

In the synthetic resin-made sliding bearing of the present invention in which the inner peripheral side passage is formed, the second suspended portion may have an inner peripheral surface which has the same diameter as the diameter of the first inner peripheral surface and is flush with the first inner peripheral surface, and the lower casing may further have a cylindrical third projecting portion formed integrally on the upper surface of the lower plate portion so as to form an annular lower groove by an outer peripheral surface thereof in cooperation with the inner peripheral surface of the second projecting portion. In this case, the second suspended portion may be disposed in the lower inner groove with a radial fifth clearance between an inner peripheral surface thereof and the outer peripheral surface of the third projecting portion and may be formed integrally on the lower surface of the upper plate portion in such a manner as to be located radially outwardly away from the first inner peripheral surface, and the inner peripheral side passage may be formed further by the third projecting portion, a radial minimum width of the fifth clearance being equal to or greater than the aforementioned relatively displaceable amount, or equal to or greater than the smaller one of the two radial clearances between the radial second and third inner peripheral surfaces, on the one hand, and the outer peripheral surface of the shaft, one the other hand, respectively. With such a synthetic resin-made sliding bearing as well, even if a fluctuating load is applied to the lower casing in the radial direction and a radial relative displacement occurs between the upper casing and the lower casing, it is possible to avoid interference attributable to the mutual pressing and contacting in the radial direction of the outer peripheral surface of the third projecting portion and the inner peripheral surface of the second suspended portion which form the inner peripheral side passage, without causing deformation, damage, breakage, or the like to occur in the third projecting portion and the second suspended portion and without causing a decline in the sliding characteristics attributable to the relative sliding at the third projecting portion and the second suspended portion.

In the synthetic resin-made sliding bearing of the present invention in which the inner peripheral side passage is formed by the outer peripheral surface of the third projecting portion and the inner peripheral surface of the second suspended portion as well, the third projecting portion may have an inner peripheral surface which has the same diameter as the diameter of the second inner peripheral surface and is flush with the second inner peripheral surface. However, in substitution of this arrangement, the upper casing may further have a cylindrical third suspended portion formed integrally on the lower surface of the upper plate portion so as to form an annular upper inner groove by an outer peripheral surface thereof in cooperation with the inner peripheral surface of the second suspended portion, the third projecting portion may be disposed in the upper inner groove with a radial sixth clearance between an inner peripheral surface thereof and the outer peripheral surface of the third suspended portion and may be formed integrally on the upper surface of the lower plate portion in such a manner as to be located radially outwardly away from the second inner peripheral surface, and the inner peripheral side passage may be formed further by the third suspended portion, a radial minimum width of the sixth clearance being identical to or greater than the aforementioned relatively displaceable amount, or equal to or greater than the smaller one of the two radial clearances between the radial second and third inner peripheral surfaces, on the one hand, and the outer peripheral surface of the shaft, one the other hand, respectively. With such a synthetic resin-made sliding bearing as well, even if a fluctuating load is applied to the lower casing in the radial direction and a radial relative displacement occurs between the upper casing and the lower casing, it is possible to avoid interference attributable to the mutual pressing and contacting in the radial direction of the inner peripheral surface of the third projecting portion and the outer peripheral surface of the third suspended portion which form the inner peripheral side passage, without causing deformation, damage, breakage, or the like to occur in the third projecting portion and the third suspended portion and without causing a decline in the sliding characteristics attributable to the relative sliding at the third projecting portion and the third suspended portion.

In the synthetic resin-made sliding bearing of the present invention in which the inner peripheral side passage is formed further by the third projecting portion, the third suspended portion may have an inner peripheral surface which has the same diameter as the diameter of the first inner peripheral surface and is flush with the first inner peripheral surface.

In the above-described synthetic resin-made sliding bearing in accordance with the present invention, in a case where both of the upper casing and the lower casing are disposed radially displaceably with respect to the shaft which is inserted therethrough, the relatively displaceable amount becomes the sum of the radial clearance of the upper casing with respect to the shaft and the radial clearance of the lower casing with respect to the shaft. However, in a case where one of the upper casing and the lower casing is radially displaceable with respect to the inserted shaft, and the other one of the upper casing and the lower casing is radially undisplaceable with respect to the inserted shaft and is disposed with an uniform bearing clearance with respect to the inserted shaft, the relatively displaceable amount becomes the radial clearance with respect to one of the upper casing and the lower casing, whereas in a case where one of the upper casing and the lower casing is radially displaceable with respect to the inserted shaft, and the other one of the upper casing and the lower casing is radially undisplaceable with respect to the inserted shaft and is disposed with a nonuniform radial clearance around the shaft with respect to the inserted shaft, due to the nonuniformity, the relatively displaceable amount ranges from the radial clearance with respect to one of the upper casing and the lower casing to the sum of the radial clearance of the upper casing with respect to the shaft and the radial clearance of the lower casing with respect to the shaft. Thus, if the minimum width is greater than the sum of the radial clearance of the upper casing with respect to the shaft and the radial clearance of the lower casing with respect to the shaft, even in the event that a radial relative displace occurs to the lower casing with respect to the upper casing due to the radial clearances between, on the one hand, the upper casing and the lower casing and, on the other hand, the shaft, it is possible to reliably avoid the interference ascribable to the pressing and contacting in the radial direction of those portions of the upper casing and the lower casing that define the clearances for forming the passage without being affected by the manner in which the upper casing and the lower casing are mounted with respect to the shaft. On the other hand, however, if that minimum width is excessively large, in cases where the thrust bearing or such a thrust sliding bearing is constituted by the thrust sliding bearing piece, the ingress of foreign objects such as dust onto the sliding surfaces of that thrust sliding bearing piece is facilitated, and therefore there is a possibility that it becomes impossible to obtain smooth steering operating force, with the result that it suffices if such a minimum width is determined by taking into consideration a balance between the avoidance of interference and the prevention of ingress of foreign objects.

In the case where a passage constituted by a labyrinth is formed on the outer peripheral side and a passage constituted by a labyrinth is formed on each of the outer peripheral side and the inner peripheral side, the ingress of foreign objects such as dust from the outside into the space between the upper casing and the lower casing where the thrust sliding bearing is disposed is effectively prevented.

Advantages of the Invention

According to the present invention, it is possible to provide a synthetic resin-made sliding bearing which, even if a fluctuating load is applied to the lower casing in the radial direction and a radial relative displacement occurs to the lower casing, is capable of avoiding interference attributable to the mutual pressing and contacting in the radial direction of those portions of the upper casing and the lower casing that define clearances for forming a passage like a labyrinth allowing the space between the upper casing and the lower casing with the thrust bearing disposed therein to communicate with the outside, and which does not cause deformation, damage, breakage, or the like to occur in those portions and does not cause a decline in the sliding characteristics attributable to the relative sliding in those portions.

MODE FOR CARRYING OUT THE INVENTION

Hereafter, a detailed description will be given of the present invention with reference to the preferred embodiments illustrated in the drawings. It should be noted that the present invention is not limited to these embodiments.

In FIGS. 1 to 4, a synthetic resin-made synthetic resin-made sliding bearing 1 in accordance with this embodiment is comprised of a synthetic resin-made upper casing 2, a synthetic resin-made lower casing 3, and a thrust sliding bearing piece 4 serving as a synthetic resin-made thrust sliding bearing interposed between the lower casing 3 and the upper casing 2 fitted over the lower casing 3.

The upper casing 2 includes an annular upper plate portion 13 having an annular upper surface 10 and an inner peripheral surface 12 defining a circular hole 11 in a central portion thereof, a cylindrical suspended portion 15 formed integrally on an annular lower surface 14 of the upper plate portion 13 in such a manner as to be spaced apart at a predetermined interval from the inner peripheral surface 12 in a radially outward direction A, and an engaging suspended portion 19 formed integrally on the lower surface 14 on the outer peripheral side of the upper plate portion 13 in such a manner as to be spaced apart at a predetermined interval from an outer peripheral surface 17 of the suspended portion 15 in the radially outward direction A such that an inner peripheral surface 16 thereof forms an annular upper outer groove 18 in cooperation with the outer peripheral surface 17 of the suspended portion 15.

The engaging suspended portion 19 includes a cylindrical portion 20 formed integrally on the lower surface 14 in such a manner as to be suspended from the lower surface 14 and a cylindrical engaging portion 21 formed integrally on the cylindrical portion 20 in such a manner as to be bulged from the inner peripheral surface of the cylindrical portion 20 in a radially inward direction B. The inner peripheral surface 16 has an annular inclined surface 22 of the cylindrical portion 20 which is inclined from the lower surface 14 in the radially outward direction A and an annular bulged surface 23 of the engaging portion 21 which is continuously connected to the inclined surface 22 and is bulged in a curved form in the radially inward direction B. The engaging portion 21 has an annular lower end face 25 located below an annular lower end face 24 of the suspended portion 15.

The lower casing 3 includes an annular lower plate portion 33 having a cylindrical outer peripheral surface 30 and an inner peripheral surface 32 which defines a circular hole 31 located in a central portion and having the same diameter as the circular hole 11 and which has the same diameter as the inner peripheral surface 12; a cylindrical projecting portion 37 formed integrally on the inner peripheral side of an annular upper surface 34 of the lower plate portion 33 and having an inner peripheral surface 36 which defines a circular hole 35 of the same diameter as the circular hole 31, has the same diameter as the inner peripheral surface 32, and is flush with the inner peripheral surface 32; a cylindrical portion 41 formed integrally on the inner peripheral side of an annular lower surface 38 of the lower plate portion 33 and having an inner peripheral surface 40 defining a circular hole 39 of the same diameter as the circular holes 31 and 35; a cylindrical projecting portion 48 formed integrally on the upper surface 34 in such a manner as to be spaced apart at a predetermined interval from the projecting portion 37 in the radially outward direction A, such that an inner peripheral surface 45 thereof forms an annular lower recess 47 in cooperation with the upper surface 34 and an outer peripheral surface 46 of the projecting portion 37; and a cylindrical engaging protruding portion 52 formed integrally on the outer peripheral side of the upper surface 34 in such a manner as to be spaced apart at a predetermined interval from the projecting portion 48 in the radially outward direction A such that an inner peripheral surface 49 thereof forms an annular lower outer groove 51 in cooperation with an outer peripheral surface 50 of the projecting portion 48.

The engaging protruding portion 52 includes a cylindrical portion 53 formed integrally on the upper surface 34 in such a manner as to project from the upper surface 34 and having the inner peripheral surface 49, as well as a cylindrical engaged portion 55 formed integrally on the outer peripheral surface of the cylindrical portion 53 in such a manner as to be bulged in the radially outward direction A and having an outer peripheral surface 54. The outer peripheral surface 54 has an annular inclined surface 57 which is inclined from an annular upper end face 56 of the cylindrical portion 53 in the radially outward direction A and opposes the inclined surface 22, as well as an annular inclined surface 58 which is continuously connected to the inclined surface 57, on the one hand, and to the outer peripheral surface 30, on the other hand, and is inclined from the inclined surface 57 in the radially inward direction B. With respect to a vertical direction C, the upper end face 56, together with an annular upper end face 59 of the projecting portion 48, is disposed at the same position as an annular upper end face 60 of the projecting portion 37. The engaged portion 55 is formed such that the diameter of its outer peripheral surface 54 at a maximally projecting position in the radially outward direction A becomes greater than the diameter of the bulged surface 23 of the engaging portion 21 at a maximally bulged position in the radially inward direction B.

The annular thrust sliding bearing piece 4, which is formed separately from the lower casing 3, includes an inner peripheral surface 62 defining a circular hole 61 in a central portion thereof and having a greater diameter than the diameter of the outer peripheral surface 46, an outer peripheral surface 63 having a smaller diameter than the diameter of the inner peripheral surface 45, an annular upper surface 64 serving as an upper annular thrust sliding bearing surface, and an annular lower surface 65 serving as a lower annular thrust sliding bearing surface. The annular thrust sliding bearing piece 4 is disposed in the lower recess 47 with annular clearances between the inner peripheral surface 62 and the outer peripheral surface 46 and between the outer peripheral surface 63 and the inner peripheral surface 45 such that the annular upper surface 64 is positioned higher than an opening plane 66 of the lower recess 47. Thus, the thrust sliding bearing piece 4 is disposed in the lower recess 47 in a space 67 between the upper casing 2 and the lower casing 3, such that the upper surface 64 is brought slidably in a circumferential direction R into contact with the lower surface 14 of the upper plate portion 13 of the upper casing 2 fitted over the lower casing 3, while the lower surface 65 is brought slidably in the circumferential direction R into contact with the upper surface 34 of the lower plate portion 33 defining the bottom surface of the lower recess 47.

Figure 2:
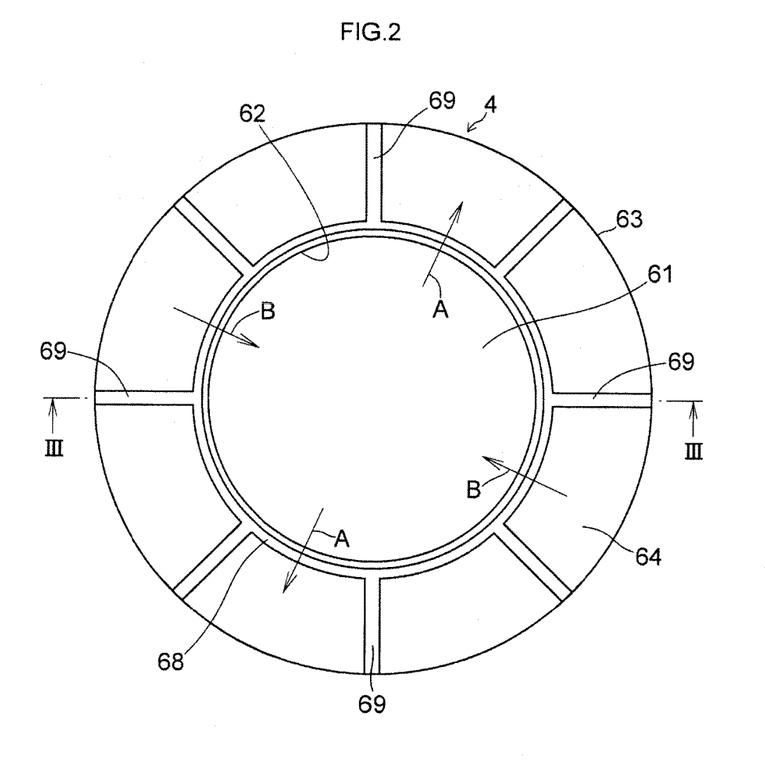
FIG. 2 is an explanatory plan view of a thrust sliding bearing piece in the embodiment shown in FIG. 1.
Figure 3:
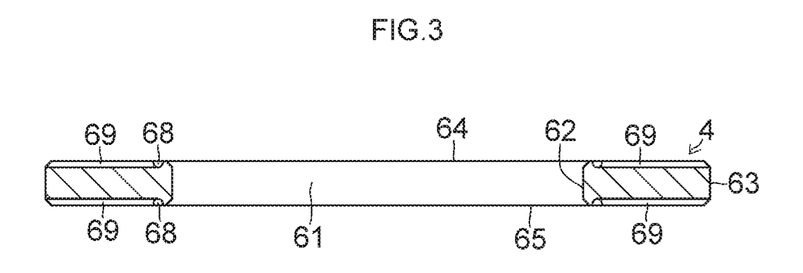
FIG. 3 is an explanatory cross-sectional view, taken in the direction of arrows along line III-III shown in FIG. 2, of the thrust sliding bearing piece in the embodiment shown in FIG. 1.

The thrust sliding bearing piece 4 further includes annular grooves 68 formed in the upper surface 64 and the lower surface 65 in such a manner as to surround the circular hole 61 and a plurality of radial grooves 69 whose one ends are open at the annular groove 68 and other ends are open at the outer peripheral surface 63, and which are arranged at equal intervals in the circumferential direction R. A lubricant such as grease is filled in these annular grooves 68 and radial grooves 69.

Figure 1:
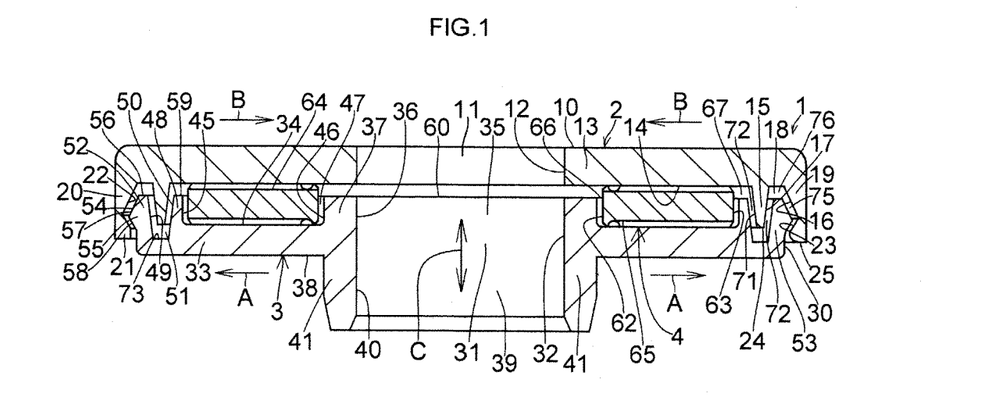
FIG. 1 is an explanatory cross-sectional view of a preferred embodiment of the invention.
Figure 4:
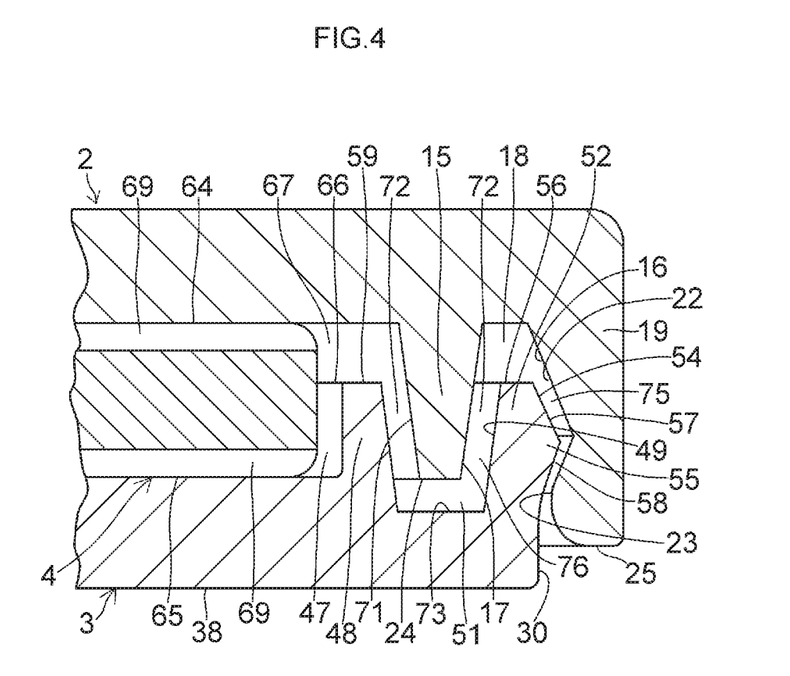
FIG. 4 is an explanatory partially enlarged cross-sectional view of the embodiment shown in FIG. 1.

As for the synthetic resin-made sliding bearing 1, the suspended portion 15 is disposed in the lower outer groove 51, defined by the outer peripheral surface 50, the inner peripheral surface 49, and additionally an annular surface 73 of the lower plate portion 33, by being provided with radial clearances 72 respectively on the radially inward direction B side and the radially outward direction A side between, on the one hand, an inner peripheral surface 71 and the outer peripheral surface 17 thereof and, on the other hand, the outer peripheral surface 50 and the inner peripheral surface 49 respectively facing them on the radially inward direction B side and the radially outward direction A side, while the engaging suspended portion 19 is disposed on the radially outward direction A side of the engaging protruding portion 52 by being provided with a radial clearance 75 between, on the one hand, the inner peripheral surface 16 thereof and, on the other hand, the outer peripheral surface 30 and the outer peripheral surface 54 respectively facing the inner peripheral surface 16 on the radially inward direction B side. Accordingly, the synthetic resin-made sliding bearing 1 is formed as the upper casing 2 is fitted over the lower casing 3 through the fitting of the engaging portion 21 with the engaged portion 55 on the basis of flexural deformation for overcoming the diametrical difference, so that an outer peripheral side passage 76, which is constituted by a labyrinth allowing a radially outer peripheral portion of the space 67 to communicate with the outside of the synthetic resin-made sliding bearing 1, is formed by the upper plate portion 13, the suspended portion 15, the projecting portion 48, the engaging suspended portion 19, the engaging protruding portion 52, and the lower plate portion 33, i.e., more specifically by the clearance between the lower surface 14 and the upper end face 59, the clearance 72 between the inner peripheral surface 71 and the outer peripheral surface 50, the clearance between the lower end face 24 and the annular surface 73, the clearance 72 between the outer peripheral surface 17 and the inner peripheral surface 49, the clearance between the lower surface 14 and the upper end face 56, and the clearance 75 between the inner peripheral surface 16, on the one hand, and the outer peripheral surface 54 and the outer peripheral surface 30, on the other hand, in such a manner as to be open at one end to the radially outer peripheral portion of the space 67 and open at the other end to outside the synthetic resin-made sliding bearing 1.

Figure 5:
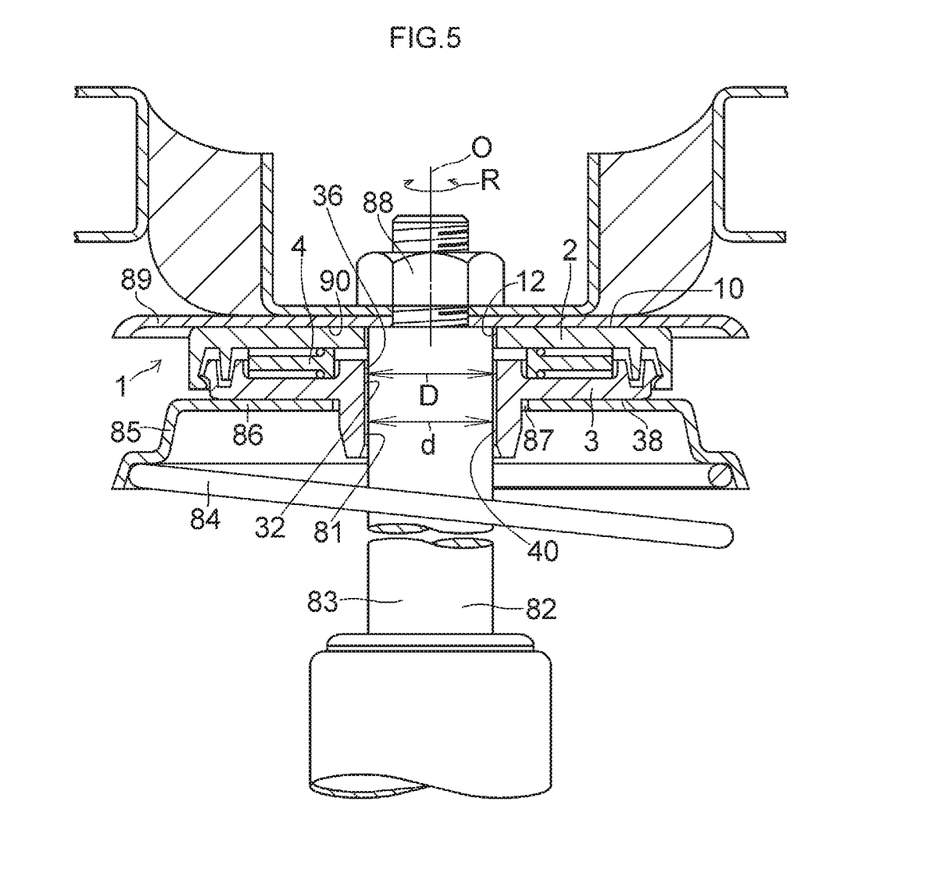
FIG. 5 is an explanatory cross-sectional view in which the embodiment shown in FIG. 1 is incorporated in a strut-type suspension.
Figure 6:
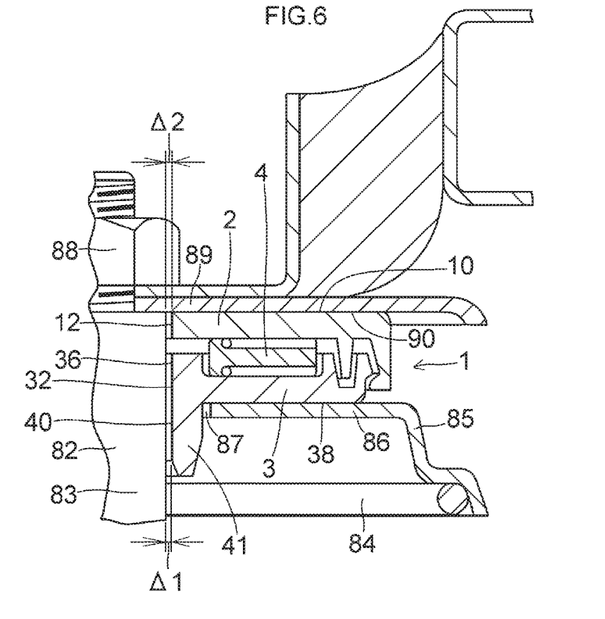
FIG. 6 is an explanatory partially enlarged cross-sectional view of FIG. 5.

As shown in FIGS. 5 and 6, such a synthetic resin-made sliding bearing 1 is disposed between an upper spring seat 85 of a coil spring 84 and a vehicle body-side mounting member 89 as follows: While a radial clearance $\Delta 1$ ($\Delta 1 = (D-d) \times \frac{1}{2}$) and a radial clearance $\Delta 2$ (in this embodiment, $\Delta 1 = \Delta 2$) are maintained uniformly in the circumferential direction R respectively between an inner peripheral surface 81 formed by the inner peripheral surfaces 32, 36, and 40 and having a diameter D and an outer peripheral surface 83 of a piston rod 82 of a strut assembly having an outside diameter d and between the inner peripheral surface 12 and the outer peripheral surface 83 of the piston rod 82, the piston rod 82 is inserted into the circular holes 11, 31, 35, and 39, and the cylindrical portion 41 having the cylindrical outer peripheral surface connected continuously to the lower surface 38 is fittingly inserted into a circular hole 87 formed in a flat plate portion 86 of the upper spring seat 85 of the coil spring 84, such that the lower surface 38 is brought into contact with the flat plate portion 86 while the upper surface 10 is brought into contact with a lower surface 90 of the vehicle body-side mounting member 89 with an upper end of the piston rod 82 secured thereto by a nut 88, and such that the upper casing 2 is not moved in the radial direction with respect to the piston rod 82.

The synthetic resin-made sliding bearing 1 is formed such that a radial minimum width of the two clearances 72 and the clearance 75 becomes greater than a smaller one of the two radial clearances $\Delta 1$ between, on the one hand, the inner peripheral surfaces 32, 36, and 40 and, on the other hand, the outer peripheral surface 83 of the piston rod 82 in the radial direction, i.e., in this embodiment, greater than the radial clearance $\Delta 1$ since the respective radial clearances $\Delta 1$ are identical.

Namely, in the synthetic resin-made sliding bearing 1, the radial minimum width of the two clearances 72 and the clearance 75 which extend in such a manner as to intersect the radial direction in the passage 76 is set to be greater than the radially relatively displaceable amount of the lower casing 3 with respect to the upper casing 2, which is regulated by the piston rod 82 which is passed through the upper casing 2, the lower casing 3, and the thrust sliding bearing piece 4 by being inserted in the circular holes 11, 31, 35, and 39 defined by the inner peripheral surfaces 12, 32, 36, and 40.

With the above-described synthetic resin-made sliding bearing 1, since the thrust sliding bearing piece 4 is interposed between the lower casing 3 and the upper casing 2 fitted over the lower casing 3, the rotation in the circumferential direction R, i.e., the rotating direction about an axis O, of the upper spring seat 85 with respect to the vehicle body-side mounting member 89 in the steering operation is effected through at least one of the rotational sliding in the circumferential direction R of the thrust sliding bearing piece 4 at the upper surface 64 thereof with respect to the lower surface 14 and the rotational sliding in the circumferential direction R of the thrust sliding bearing piece 4 at the lower surface 65 thereof with respect to the upper surface 34. As a result, smooth steering operation can be obtained. Moreover, since the radial minimum width of the clearances 72 and the clearance 75 is greater than the respective radial clearance $\Delta 1$ at the inner peripheral surfaces 32, 36, and 40 with respect to the outer peripheral surface 83 of the piston rod 82, even if a radial relative displacement of at most the radial clearance $\Delta 1$ occurs to the lower casing 3 with respect to the upper casing 2, it is possible to avoid the interference ascribable to the mutual pressing and contacting in the radial direction between the engaging suspended portion 19 and the engaging protruding portion 52 and the interference ascribable to the mutual pressing and contacting in the radial direction between, on the one hand, the suspended portion 15 and, on the other hand, the projecting portion 48 and the engaging protruding portion 52. As a result, even if such a radial relative displacement of at most the radial clearance $\Delta 1$ occurs to the lower casing 3 with respect to the upper casing 2, deformation, damage, breakage, or the like does not occur in the suspended portion 15, the engaging suspended portion 19, the projecting portion 48, and the engaging protruding portion 52, and an increase in frictional resistance ascribable to that interference does not occur in the relative rotation in the circumferential direction R of the lower casing 3 with respect to the upper casing 2, thereby making it possible to maintain smooth steering operation.

Namely, with the synthetic resin-made sliding bearing 1, it is possible to avoid both the pressing and contacting in the radial direction between the engaging suspended portion 19 and the engaging protruding portion 52 and the pressing and contacting in the radial direction between, on the one hand, the suspended portion 15 and, on the other hand, the projecting portion 48 and the engaging protruding portion 52, which are ascribable to the radial clearance Δ1 required for the insertion of the piston rod 82, so that smooth steering operation can be ensured.

Figure 7:
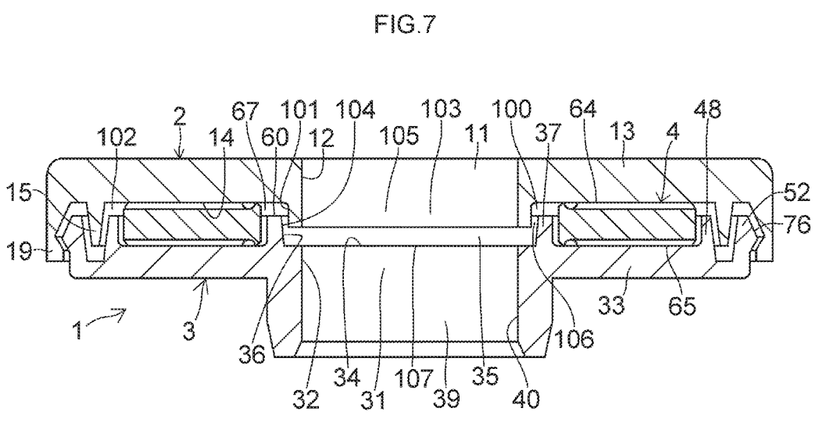
FIG. 7 is an explanatory cross-sectional view of another preferred embodiment of the invention.

In the synthetic resin-made sliding bearing 1 shown in FIGS. 1 to 4, the passage 76 is formed only on the outer peripheral side; however, the synthetic resin-made sliding bearing 1 may have an inner peripheral side passage 100 in addition to such an outer peripheral side passage 76, as shown in FIG. 7. In the synthetic resin-made sliding bearing 1 shown in FIG. 7, the upper casing 2 may further include a cylindrical suspended portion 104 which is integrally formed on the lower surface 14 of the upper plate portion 13 so as to form an annular upper recess 102 by a cylindrical outer peripheral surface 101 thereof smaller in diameter than the inner peripheral surface 36 in cooperation with the lower surface 14 of the upper plate portion 13 and the inner peripheral surface 71 of the suspended portion 15, and which has a cylindrical inner peripheral surface 103 identical in diameter to and flush with the inner peripheral surface 12 and smaller in diameter than the outer peripheral surface 101. In this case, the projecting portion 37 is integrally formed on the upper surface 34 of the lower plate portion 33 in such a manner as to be located away from the inner peripheral surface 32 in the radially outward direction A, and the suspended portion 104 having the inner peripheral surface 103 defining a circular hole 105 communicating with the circular hole 11 is suspended toward the upper surface 34 of the lower plate portion 33 in such a manner as to form a radial clearance 106 between the outer peripheral surface 101 thereof and the inner peripheral surface 36 of the projecting portion 37. Thus, the inner peripheral side passage 100, which is constituted by a labyrinth allowing the radially inner peripheral portion of the space 67 to communicate with the outside of the synthetic resin-made sliding bearing 1 through the portions of the radial clearances Δ1 and Δ2, is formed by clearances including the clearance between the upper end face 60 and the lower surface 14 and the clearance 106 between the outer peripheral surface 101 and the inner peripheral surface 36 in such a manner as to be open at one end to the radially inner peripheral portion of the space 67 and open at the other end to the circular hole 35 between upper surface 34 and an annular lower end face 107 of the suspended portion 104. The radial minimum width of the clearance 106 which extends in such a manner as to intersect the radial direction in the passage 100 is set to be greater than the radial clearance Δ1, and is therefore set to be greater than the radially relatively displaceable amount of the lower casing 3 with respect to the upper casing 2, which is regulated by the piston rod 82 which is passed through the upper casing 2, the lower casing 3, and the thrust sliding bearing piece 4 by being inserted in the circular holes 11, 31, 39, and 105 defined by the inner peripheral surfaces 12, 32, 40, and 103.

With the above-described synthetic resin-made sliding bearing 1 shown in FIG. 7 as well, since the radial minimum width of the clearance 106 is greater than the respective radial clearance Δ1 at the inner peripheral surfaces 32 and 40 with respect to the outer peripheral surface 83 of the piston rod 82, even if a radial relative displacement of at most the radial clearance Δ1 occurs to the lower casing 3 with respect to the upper casing 2, it is possible to avoid the interference ascribable to the mutual pressing and contacting in the radial direction between the suspended portion 104 and the projecting portion 37 in addition to the radial interference between the engaging suspended portion 19 and the engaging protruding portion 52 and the interference ascribable to the mutual pressing and contacting in the radial direction between, on the one hand, the suspended portion 15 and, on the other hand, the projecting portion 48 and the engaging protruding portion 52. As a result, even if such a radial relative displacement of at most the radial clearance Δ1 occurs to the lower casing 3 with respect to the upper casing 2, defects such as deformation, damage, breakage, or the like does not occur in suspended portion 104 and the projecting portion 37 in addition to the suspended portion 15, the engaging suspended portion 19, the projecting portion 48, and the engaging protruding portion 52, and an increase in frictional resistance ascribable to that interference does not occur in the relative rotation in the circumferential direction R of the lower casing 3 with respect to the upper casing 2, thereby making it possible to maintain smooth steering operation.

Figure 8:
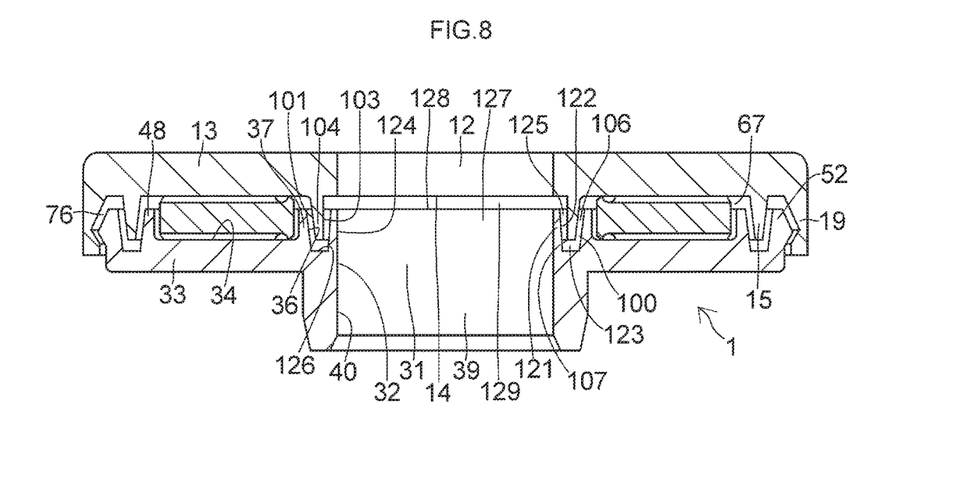
FIG. 8 is an explanatory cross-sectional view of still another preferred embodiment of the invention.

In the synthetic resin-made sliding bearing 1 shown in FIG. 7, the inner peripheral side passage 100 is formed by the projecting portion 37 and the suspended portion 104; however, in addition to this arrangement, the synthetic resin-made sliding bearing 1 may be provided with the inner peripheral side passage 100 which is formed further by a cylindrical outer peripheral surface 122 of a projecting portion 121 and the inner peripheral surface 103 of the suspended portion 104, as shown in FIG. 8. Namely, in the synthetic resin-made sliding bearing 1 shown in FIG. 8, the lower casing 3 further has the cylindrical projecting portion 121 which is integrally formed on the upper surface 34 of the lower plate portion 33 and has, in addition to the outer peripheral surface 122, a cylindrical inner peripheral surface 124 identical in diameter to and flush with the inner peripheral surface 32 and smaller in diameter than the outer peripheral surface 122, so as to form an annular lower inner groove 123 deeper than the lower recess 47 by the cylindrical outer peripheral surface 122 smaller in diameter than the diameters of the inner peripheral surfaces 36 and 103 in cooperation with the inner peripheral surface 36 of the projecting portion 37. The suspended portion 104 is disposed in the lower inner groove 123, defined by the inner peripheral surface 36, the outer peripheral surface 122, and an annular surface 126 of the lower plate portion 33, with a radial clearance 125 between the inner peripheral surface 103 thereof and the outer peripheral surface 122 of the projecting portion 121, and is integrally formed on the lower surface 14 of the upper plate portion 13 in such a manner as to be located away from the inner peripheral surface 12 in the radially outward direction A. The inner peripheral surface 124 defines a circular hole 127 communicating with the circular hole 31. Thus, the inner peripheral side passage 100, which allows the radially inner peripheral portion of the space 67 to communicate with the outside of the synthetic resin-made sliding bearing 1 through the portions of the radial clearances Δ1 and Δ2, is formed further by the clearance 125, the clearance between the annular surface 126 and the lower end face 107 of the suspended portion 104, and the clearance between the lower surface 14 and an annular upper end face 128 of the projecting portion 121 in addition to the clearance between the upper end face 60 and the lower surface 14 and the clearance 106 between the outer peripheral surface 101 and the inner peripheral surface 36, in such a manner as to be open at one end to the radially inner peripheral portion of the space 67 and open at the other end to an annular space 129 between the circular hole 11 and the circular hole 31. The radial minimum width of the clearance 125 which extends in such a manner as to intersect the radial direction in the passage 100 constituted by the labyrinth is set to be greater than the radial clearance $\Delta 1$, and is therefore set to be greater than the amount of radial relative displacement of the lower casing 3 with respect to the upper casing 2, which is regulated by the piston rod 82 which is passed through the upper casing 2, the lower casing 3, and the thrust sliding bearing piece 4 by being inserted in the circular holes 11, 31, 39, and 127 defined by the inner peripheral surfaces 12, 32, 40, and 124.

With the above-described synthetic resin-made sliding bearing 1 shown in FIG. 8 as well, since the radial minimum width of the clearance 125 is greater than the respective radial clearance $\Delta 1$ at the inner peripheral surfaces 32, 40, and 124 with respect to the outer peripheral surface 83 of the piston rod 82, even if a radial relative displacement of at most the radial clearance $\Delta 1$ occurs to the lower casing 3 with respect to the upper casing 2, it is possible to avoid the interference ascribable to the mutual pressing and contacting in the radial direction between the suspended portion 104 and the projecting portion 121 in addition to the interference ascribable to the mutual pressing and contacting in the radial direction between the engaging suspended portion 19 and the engaging protruding portion 52, the interference ascribable to the mutual pressing and contacting in the radial direction between, on the one hand, the suspended portion 15 and, on the other hand, the projecting portion 48 and the engaging protruding portion 52, and the interference ascribable to the mutual pressing and contacting in the radial direction between the suspended portion 104 and the projecting portion 37. As a result, even if such a radial relative displacement of at most the radial clearance $\Delta 1$ occurs to the lower casing 3 with respect to the upper casing 2, deformation, damage, breakage, or the like does not occur in suspended portion 104, the projecting portion 37, and the projecting portion 121 in addition to the suspended portion 15, the engaging suspended portion 19, the projecting portion 48, and the engaging protruding portion 52, and an increase in frictional resistance ascribable to that interference does not occur in the relative rotation in the circumferential direction R of the lower casing 3 with respect to the upper casing 2, thereby making it possible to maintain smooth steering operation.

Figure 9:
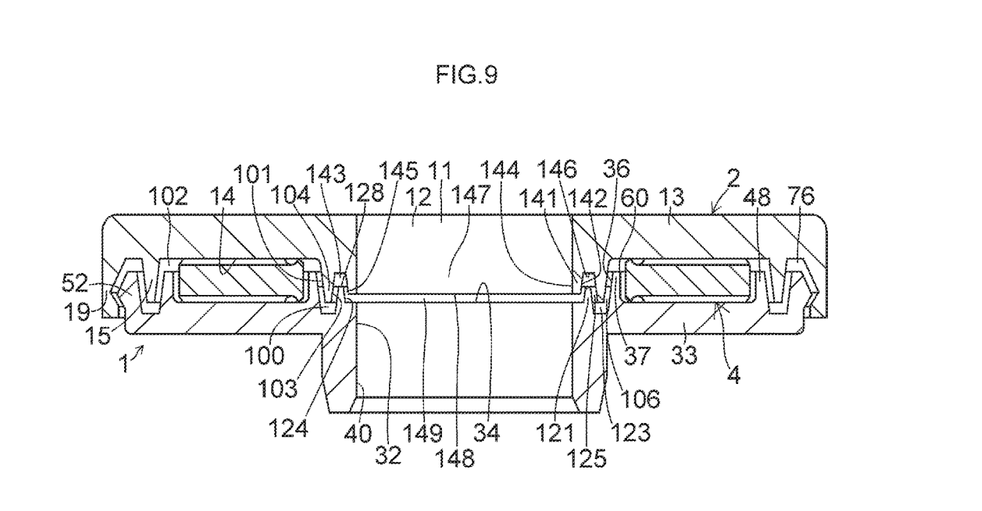
FIG. 9 is an explanatory cross-sectional view of a further preferred embodiment of the invention.

In the synthetic resin-made sliding bearing 1 shown in FIG. 8, the inner peripheral side passage 100 is formed by the projecting portion 37, the suspended portion 104, and the projecting portion 121; however, in addition to this arrangement, the synthetic resin-made sliding bearing 1 may be provided with the inner peripheral side passage 100 which is formed further by the cylindrical inner peripheral surface 124 of the projecting portion 121 and an outer peripheral surface 142 of a suspended portion 141, as shown in FIG. 9. Namely, in the synthetic resin-made sliding bearing 1 shown in FIG. 9, the upper casing 2 further has the cylindrical suspended portion 141 which is integrally formed on the lower surface 14 of the upper plate portion 13 and has, in addition to the outer peripheral surface 142, a cylindrical inner peripheral surface 144 identical in diameter to and flush with the inner peripheral surface 12 and smaller in diameter than the outer peripheral surface 142, so as to form an annular upper inner groove 143 shallower than the upper recess 102 by the cylindrical outer peripheral surface 142 smaller in diameter than the diameters of the inner peripheral surfaces 103 and 124 in cooperation with the inner peripheral surface 103 of the suspended portion 104. The projecting portion 121 is disposed in the upper inner groove 143, defined by the inner peripheral surface 103, the outer peripheral surface 142, and an annular surface 146 of the upper plate portion 13, with a radial clearance 145 between the inner peripheral surface 124 thereof and the outer peripheral surface 142 of the suspended portion 141, and is integrally formed on the upper surface 34 of the lower plate portion 33 in such a manner as to be located away from the inner peripheral surface 32 in the radially outward direction A. The inner peripheral surface 144 defines a circular hole 147 communicating with the circular hole 11. Thus, the inner peripheral side passage 100, which allows the radially inner peripheral portion of the space 67 to communicate with the outside of the synthetic resin-made sliding bearing 1 through the portions of the radial clearances $\Delta 1$ and $\Delta 2$, is formed further by the clearance 145, the clearance between the annular upper end face 128 of the projecting portion 121 and the annular surface 146, and the clearance between an annular lower end face 148 of the suspended portion 141 in addition to the clearance between the upper end face 60 and the lower surface 14, the clearance 106, the clearance between the annular surface 126 and the lower end face 107 of the suspended portion 104, and the clearance 125 between the inner peripheral surface 103 and the outer peripheral surface 122 of the projecting portion 121, in such a manner as to be open at one end to the radially inner peripheral portion of the space 67 and open at the other end to an annular space 149 between the circular hole 147 and the circular hole 31. The radial minimum width of the clearance 145 which extends in such a manner as to intersect the radial direction in the passage 100 constituted by the labyrinth is set to be greater than the radial clearance $\Delta 1$, and is therefore set to be greater than the radially relatively displaceable amount of the lower casing 3 with respect to the upper casing 2, which is regulated by the piston rod 82 which is passed through the upper casing 2, the lower casing 3, and the thrust sliding bearing piece 4 by being inserted in the circular holes 11, 31, 39, and 147 defined by the inner peripheral surfaces 12, 32, 40, and 144.

With the above-described synthetic resin-made sliding bearing 1 shown in FIG. 9 as well, since the radial minimum width of the clearance 145 is greater than the respective radial clearance $\Delta 1$ at the inner peripheral surfaces 32 and 40 with respect to the outer peripheral surface 83 of the piston rod 82, even if a radial relative displacement of at most the radial clearance $\Delta 1$ occurs to the lower casing 3 with respect to the upper casing 2, it is possible to avoid the interference ascribable to the mutual pressing and contacting in the radial direction between the projecting portion 121 and the suspended portion 141 in addition to the interference ascribable to the mutual pressing and contacting in the radial direction between the engaging suspended portion 19 and the engaging protruding portion 52, the interference ascribable to the mutual pressing and contacting in the radial direction between, on the one hand, the suspended portion 15 and, on the other hand, the projecting portion 48 and the engaging protruding portion 52, and the interference ascribable to the mutual pressing and contacting in the radial direction between the suspended portion 104 and the projecting portion 37, the interference ascribable to the mutual pressing and contacting in the radial direction between the suspended portion 104 and the projecting portion 121. As a result, even if such a radial relative displacement of at most the radial clearance Δ1 occurs to the lower casing 3 with respect to the upper casing 2, deformation, damage, breakage, or the like does not occur in the suspended portion 104, the projecting portion 37, the projecting portion 121, and the suspended portion 141 in addition to the suspended portion 15, the engaging suspended portion 19, the projecting portion 48 and the engaging protruding portion 52, and an increase in frictional resistance attributable to that interference does not occur in the relative rotation in the circumferential direction R of the lower casing 3 with respect to the upper casing 2, thereby making it possible to maintain smooth steering operation.

With the above-described synthetic resin-made sliding bearing 1, by particularly avoiding the interference (pressing and contacting) on the outer peripheral side, it is possible to maintain smooth steering operation with a low resisting force without affecting the rotational moment in the relative rotation in the circumferential direction R of the lower casing 3 with respect to the upper casing 2.

DESCRIPTION OF REFERENCE NUMERALS

1: synthetic resin-made sliding bearing
2: upper casing
3: lower casing
4: thrust sliding bearing piece
10: upper surface
11, 31, 35, 39, 61: circular hole
12, 16, 32, 36, 40, 45, 49, 62: inner peripheral surface
13: upper plate portion
14, 38: lower surface
15: suspended portion
17, 46, 50, 63: outer peripheral surface
18: upper outer groove
19: engaging suspended portion
30: outer peripheral surface
33: lower plate portion
34, 64: upper surface
37, 48: projecting portion
38, 65: lower surface
41: cylindrical portion
47: lower recess
51: lower outer groove
52: engaging protruding portion
66: opening plane
67: space

The invention claimed is:

1. A combination mechanism of a synthetic resin-made sliding bearing and a shaft,
said synthetic resin-made sliding bearing comprising:
a synthetic resin-made upper casing including an annular upper plate portion having a first inner peripheral surface, a cylindrical first suspended portion formed integrally on a lower surface of the upper plate portion, and a cylindrical engaging suspended portion formed integrally on the lower surface of the upper plate portion so as to form an annular upper outer groove by an inner peripheral surface thereof in cooperation with an outer peripheral surface of the first suspended portion;
a synthetic resin-made lower casing including an annular lower plate portion having a second inner peripheral surface, a cylindrical portion formed integrally on a lower surface of the lower plate portion and having a third inner peripheral surface, a cylindrical first projecting portion formed integrally on an upper surface of the lower plate portion, and a cylindrical engaging protruding portion formed integrally on the upper surface of the lower plate portion so as to form an annular lower outer groove by an inner peripheral surface thereof in cooperation with an outer peripheral surface of the first projecting portion; and
a synthetic resin-made thrust sliding bearing piece disposed in a space between said upper casing and said lower casing such that an upper surface thereof is brought into slidable contact with the lower surface of the upper plate portion of said upper casing fitted over said lower casing, while a lower surface thereof is brought into slidable contact with the upper surface of said lower plate portion,
said shaft being inserted in circular holes defined by the first to the third inner peripheral surfaces,
the first suspended portion being disposed in the lower outer groove with a radial first clearance and a radial second clearance between an inner peripheral surface thereof and an outer peripheral surface thereof, on the one hand, and the outer peripheral surface of the first projecting portion and the inner peripheral surface of the engaging protruding portion, on the other hand, respectively,
the engaging suspended portion is disposed radially outwardly of the engaging protruding portion with a radial third clearance between the inner peripheral surface thereof and an outer peripheral surface of the engaging protruding portion, and
an outer peripheral side passage formed by the first suspended portion, the first projecting portion, the engaging suspended portion, and the engaging protruding portion allows a radially outer peripheral portion of the space to communicate with an outside,
a radial minimum width of each of the first to third clearances being equal to or greater than a radially relatively displaceable amount of said lower casing with respect to said upper casing which is regulated by the shaft.

2. The combination mechanism of the synthetic resin-made sliding bearing and the shaft according to claim 1, wherein the first inner peripheral surface has a same diameter as a diameter of the second inner peripheral surface.

3. The combination mechanism of the synthetic resin-made sliding bearing and the shaft according to claim 1, wherein the third inner peripheral surface has the same diameter as the diameter of the second inner peripheral surface and is flush with the second inner peripheral surface.

4. The combination mechanism of the synthetic resin-made sliding bearing and the shaft according to claim 1, wherein the radial minimum width of each of the first to third clearances is equal to or greater than a smaller one of two radial clearances between the radial second and third inner peripheral surfaces, on the one hand, and an outer peripheral surface of the shaft, one the other hand, respectively.

5. The combination mechanism of the synthetic resin-made sliding bearing and the shaft according to claim 1, wherein said upper casing further includes a cylindrical second suspended portion formed integrally on the lower surface of the upper plate portion so as to form an annular upper recess by the outer peripheral surface thereof in cooperation with the lower surface of the upper plate portion and the inner peripheral surface of the first suspended portion.

6. The combination mechanism of the synthetic resin-made sliding bearing and the shaft according to claim 1, further comprising a second projecting portion formed integrally on the upper surface of the lower plate portion and having an outer peripheral surface for forming an annular lower recess in cooperation with an inner peripheral surface of the first projecting portion and the upper surface of the lower plate portion, wherein said thrust sliding bearing piece is disposed in the lower recess in the space.

7. The combination mechanism of the synthetic resin-made sliding bearing and the shaft according to claim 6, wherein the second projecting portion has the inner peripheral surface which has a same diameter as the diameter of the second inner peripheral surface and is flush with the second inner peripheral surface.

8. The combination mechanism of the synthetic resin-made sliding bearing and the shaft according to claim 6, wherein said upper casing further has a cylindrical second suspended portion formed integrally on the lower surface of the upper plate portion so as to form an annular upper recess by the outer peripheral surface thereof in cooperation with the lower surface of the upper plate portion and the inner peripheral surface of the first suspended portion, and
wherein the second projecting portion is integrally formed on the upper surface of the lower plate portion in such a manner as to be located radially outwardly away from the second inner peripheral surface,
the second suspended portion is suspended toward the upper surface of the lower plate portion so as to form a radial fourth clearance between the outer peripheral surface thereof and the inner peripheral surface of the second projecting portion, and
an inner peripheral side passage formed by the second suspended portion and the second projecting portion allows a radially inner peripheral portion of the space to communicate with the outside,
a radial minimum width of the fourth clearance being equal to or greater than the relatively displaceable amount.

9. The combination mechanism of the synthetic resin-made sliding bearing and the shaft according to claim 8, wherein the radial minimum width of the fourth clearance is equal to or greater than the smaller one of the two radial clearances between the radial second and third inner peripheral surfaces, on the one hand, and the outer peripheral surface of the shaft, one the other hand, respectively.

10. The combination mechanism of the synthetic resin-made sliding bearing and the shaft according to claim 8, wherein the second suspended portion has an inner peripheral surface which has a same diameter as the diameter of the first inner peripheral surface and is flush with the first inner peripheral surface.

11. The combination mechanism of the synthetic resin-made sliding bearing and the shaft according to claim 8, wherein said lower casing further has a cylindrical third projecting portion formed integrally on the upper surface of the lower plate portion so as to form the annular lower inner groove by an outer peripheral surface thereof in cooperation with the inner peripheral surface of the second projecting portion,
the second suspended portion is disposed in the lower inner groove with a radial fifth clearance between an inner peripheral surface thereof and the outer peripheral surface of the third projecting portion and is formed integrally on the lower surface of the upper plate portion in such a manner as to be located radially outwardly away from the first inner peripheral surface, and
the inner peripheral side passage is formed further by the third projecting portion,
a radial minimum width of the fifth clearance being equal to or greater than the relatively displaceable amount.

12. The combination mechanism of the synthetic resin-made sliding bearing and the shaft according to claim 11, wherein the radial minimum width of the fifth clearance is equal to or greater than the smaller one of the two radial clearances between the radial second and third inner peripheral surfaces, on the one hand, and the outer peripheral surface of the shaft, one the other hand, respectively.

13. The combination mechanism of the synthetic resin-made sliding bearing and the shaft according to claim 11, wherein the third projecting portion has an inner peripheral surface which has a same diameter as the diameter of the second inner peripheral surface and is flush with the second inner peripheral surface.

14. The combination mechanism of the synthetic resin-made sliding bearing and the shaft according to claim 11, wherein said upper casing further has a cylindrical third suspended portion formed integrally on the lower surface of the upper plate portion so as to form the annular upper inner groove by an outer peripheral surface thereof in cooperation with the inner peripheral surface of the second suspended portion,
the third projecting portion is disposed in the upper inner groove with a radial sixth clearance between an inner peripheral surface thereof and the outer peripheral surface of the third suspended portion and is formed integrally on the upper surface of the lower plate portion in such a manner as to be located radially outwardly away from the second inner peripheral surface, and
the inner peripheral side passage is formed further by the third suspended portion,
a radial minimum width of the sixth clearance being equal to or greater than the relatively displaceable amount.

15. The combination mechanism of the synthetic resin-made sliding bearing and the shaft according to claim 14, wherein the third suspended portion has an inner peripheral surface which has a same diameter as the diameter of the first inner peripheral surface and is flush with the first inner peripheral surface.

16. The combination mechanism of the synthetic resin-made sliding bearing and the shaft according to claim 14, wherein the radial minimum width of the sixth clearance is equal to or greater than the smaller one of the two radial clearances between the radial second and third inner peripheral surfaces, on the one hand, and the outer peripheral surface of the shaft, one the other hand, respectively.

17. A combination mechanism of a synthetic resin-made sliding bearing and a shaft,
said synthetic resin-made sliding bearing comprising:
a synthetic resin-made upper casing;
a synthetic resin-made lower casing; and
a synthetic resin-made thrust sliding bearing interposed between said lower casing and said upper casing fitted over said lower casing,
said shaft being inserted through said upper casing and said lower casing,
wherein a radial minimum width of clearances extending in such a manner as to intersect a radial direction, among clearances for forming an outer peripheral side passage which allows a radially outer peripheral portion of a space between said upper casing and said lower casing with said thrust sliding bearing disposed therein to communicate with an outside, is equal to or greater than a radially relatively displaceable amount of said lower casing with respect to said upper casing which is regulated by the shaft.

18. A combination mechanism of a synthetic resin-made sliding bearing and a shaft,
   said synthetic resin-made sliding bearing comprising:
   a synthetic resin-made upper casing;
   a synthetic resin-made lower casing; and
   a synthetic resin-made thrust sliding bearing interposed between said lower casing and said upper casing fitted over said lower casing,
   said shaft being inserted through said upper casing and said lower casing,
   a radial minimum width of clearances extending in such a manner as to intersect a radial direction, among clearances for forming an outer peripheral side passage which allows a radially outer peripheral portion of a space between said upper casing and said lower casing with said thrust sliding bearing disposed therein to communicate with an outside and clearances extending in such a manner as to intersect the radial direction among clearances for forming an inner peripheral side passage which allows a radially inner peripheral portion of the space to communicate with the outside, being equal to or greater than a radially relatively displaceable amount of said lower casing with respect to said upper casing which is regulated by the shaft.

* * * * *